United States Patent [19]

Field

[11] Patent Number: 4,585,812
[45] Date of Patent: Apr. 29, 1986

[54] POLYMERIC DISPERSIONS

[75] Inventor: John R. Field, West Yorkshire, Great Britain

[73] Assignee: Allied Colloids Limited, England

[21] Appl. No.: 699,988

[22] Filed: Feb. 11, 1985

[30] Foreign Application Priority Data

Feb. 17, 1984 [GB] United Kingdom ............... 8404203
Nov. 19, 1984 [GB] United Kingdom ............... 8429215

[51] Int. Cl.$^4$ .............................................. C08J 3/02
[52] U.S. Cl. .................................... 523/221; 524/555
[58] Field of Search ............... 523/220, 221; 524/555

[56] References Cited

U.S. PATENT DOCUMENTS 3,847,851 11/1974 Tugukuni .......................... 523/221
4,420,586 12/1983 Bhattacharyya ................... 524/555

Primary Examiner—Paul R. Michl
Attorney, Agent, or Firm—Lawrence Rosen

[57] ABSTRACT

A high solids, pumpable stable dispersion of substantially anhydrous water soluble or swellable polymer particles contains at least 70% by weight polymer and contains 1 part by weight fine polymer particles below 10 microns in size and 0.1 to 7 parts by weight coarse polymer particles having a size of 10 to 300 microns with substantially no particles above 300 microns.

18 Claims, No Drawings

POLYMERIC DISPERSIONS

Water soluble or water swellable polymers may be supplied to the user as solutions, as solid grade particulate polymers or as dispersions, that is to say dispersions in a non-aqueous liquid of polymer particles.

Solid polymers, for instance as obtained by grinding polymers made by gel polymerisation, tend to have the highest molecular weight and this is generally preferred, for instance for use as a flocculant. Solid polymers also have the advantage of having the maximum active polymer content. Polymer dispersions have a lower active polymer content and polymer solutions have the lowest active polymer content. Despite the advantages of solid polymers, some suppliers and users consider it inconvenient to use solid particulate polymer, for instance because of the care that is needed when it is to be added to water and because of handling difficulties, and so prefer dispersion products despite their lower active polymer content.

Dispersion products are generally made by reverse phase polymerisation, that is to say polymerisation of monomer whilst present in aqueous solution as a dispersion in a non-aqueous liquid. The resultant polymer dispersion consists of polymer particles swollen by water dispersed in the non-aqueous liquid and a typical composition may comprise one part by weight polymer particles, one part by weight water adsorbed into the polymer particles and one part by weight non-aqueous liquid in which the aqueous polymer particles are dispersed. Additionally the dispersion will include stabiliser for stabilising the dispersion and often also an emulsifier. The reverse phase polymerisation may, depending upon the conditions, be termed reverse phase emulsion polymerisation or reverse phase suspension polymerisation and early disclosures appear in U.S. Pat. Nos. 2,989,749 and 3,284,393. It is known to dehydrate the dispersions, for instance by azeotropic distillation as described in U.S. Pat. No. 4,052,353. It is alleged that the polymer may be present in the oil in an amount of up to 85% based on the weight of the dispersion but in practice the normal commercial maximum is around 50% by weight and it is very difficult, on a commercial scale, to obtain stable dispersions having polymer contents above about 60% although sometimes values up to about 67% or 68% may be obtainable using very carefully controlled conditions.

Reverse phase polymerisation gives a particle size distribution that is relatively narrow and accurately controlled. For instance if it is intended that the average particle size should be below 5 microns the product would, in commercial production, be substantially free of particles above 10 microns. Dispersion products are generally manufactured commercially to have particle sizes below 10 microns, typically in the range 0.1 to 2 or 3 microns.

It is proposed in U.S. Pat. No. 4,374,216 to increase the soluble polymer content of a dehydrated polymer in oil dispersion by slurrying finely divided water soluble polymer into the dehydrated dispersion to give a polymer content of 40 to 80% by weight of the dispersion. The dispersion that is dehydrated is always made by reverse phase polymerisation from monomers such as acrylamide and acrylic acid. The finely divided polymer that is added is, in most instances, a natural or semi-synthetic polymer such as a cellulose derivative or a gum but can also be a synthetic polymer. In most examples, the added polymer is cellulosic or a gum added in an amount up to about twice the amount by weight of polymer in the dehydrated dispersion. In the only example of the addition of synthetic polymer, polyacrylamide sold under the trade name Percol 351 is used. This material has a particle size range extending up to about 1 or 1.2 mm. The total polymer content in this example is 63.7% by weight of the dispersion, and this is only slightly above amounts conveniently attainable by conventional reverse phase polymerisation methods. In this example, and most of the others, the clay sold under the trade name Bentone is added to stabilise the dispersion.

We have established that, in the absence of Bentone, the polymer would settle from the dispersion as a solid phase which cannot easily be redispersed. Unfortunately, the presence of Bentone makes the dispersion very viscous. It would be desirable to be able to increase the polymer concentration so that it is significantly above the amounts available commercially by other methods, e.g. to above 70%, but we have found that increasing the amount of polyacrylamide Percol 351 merely increases the instability problems.

According to the invention a substantially stable, pumpable liquid composition comprises a dispersion of substantially anhydrous particles of water soluble or water swellable polymer in a non-aqueous liquid, the amount of the particles is at least 70% by weight of the dispersion, and the polymer particles consist of one part by weight fine particles having a particle size below 10 microns and about 0.05 to 0.1 to about 7 parts by weight coarse particles having a particle size of 10 to 300 microns with substantially no particles above 300 microns.

Preferably the particles comprise one part by weight fine particles having a particle size below 3 microns and about 0.1 to about 7 parts by weight of the coarse particles. Preferably the coarse particles include at least about 1 part by weight of particles having a particle size above 20 or 30, and most preferably above 50, microns and generally at least half of the total amount of coarse particles should be above 20 or 30, and generally above 50, microns. Normally there are about 1 to 7 parts particles above 20 microns. The total amount of coarse particles that are to be added will depend on the amount of fine particles and the desired final polymer content. If the amount of fines is high, e.g. up to about 65 to 67% by weight of fines plus oil, the amount of coarse polymer may be low, e.g. 0.1 or, more usually 0.15 to 0.5 parts, or more per part of fines. When the amount of fines is lower e.g. not above 60%, the amount of coarse particles is usually at least 1 part per part fines.

By saying that the composition is a pumpable liquid we mean that it can be prepared and pumped, by the user, using commercially available equipment. Naturally, since the viscosity of the composition is quite high, pumping apparatus designed for handling high viscous systems must be used. Double acting diaphragm pumps are usually suitable. In order that the composition is pumpable its viscosity should preferably be not more than 30,000 cP (throughout the specification all references to viscosity are Brookfield Viscosity measured at 20 rpm using Spindle 6). However if the pumping and other apparatus is designed appropriately, slightly higher viscosities may be usable.

By saying that the composition is substantially stable we mean that it is stable against deoiling and against settlement within a few hours or days of formation to provide a cake that cannot be redispersed and that, over this time scale, it is preferably stable against separation into a lower high solids phase and an upper low solids phase it may be possible to reform a stable composition by thorough mixing, provided a cake has not been formed. Deoiling involves the formation of a solid coating on parts of the apparatus that come into contact with the composition, e.g. the formation of a solid coating around the top of a storage vessel. Significant deoiling of this type should be avoided.

Stability over this short time scale is adequate provided the user will use the composition sufficiently quickly. This is of value when, for instance, the user will, on site, blend the coarse particles into a dispersion of the fine particles. This gives the advantage of dosing the coarse particles as a dispersion in oil into the water used for making up a solution. Preferably however the composition is wholly stable, that is to say it does not form a cake that cannot be redispersed, and preferably does not deoil, on storage for a prolonged period, generally at least one month and preferably two or three months or more, as the invention then permits, for the first time, the commercial production, storage, shipping and use of a liquid composition having a very high active polymer content.

It would normally be expected that increasing the amount of polymer in the dispersion would reduce the stability and pumpability. This is confirmed by the commercial experience that it is not possible to make on a commercial scale pumpable stable dispersions having some of the very high polymer concentrations suggested in the literature. It is also confirmed by the fact that loading more Percol 351 into the composition of Example IV of U.S. Pat. No. 4,374,216 merely increases instability, including deoiling, problems.

However in the invention we have surprisingly found that, with the combination of particle sizes defined in the invention, the ability to achieve a stable and pumpable dispersion increases, rather than decreases, when the polymer concentration is increased above 70% by weight of the dispersion. For instance, a dispersion formed of a particular blend of particle sizes may be stable at a polymer content of, say, 75% but may settle into two phases that cannot be redispersed at a polymer content of, say, 65%.

The stable dispersions of the invention are best made by forming a dispersion in the non-aqueous liquid of most or all of the fine polymer particles having a dry particle size below 10 microns and then adding the coarse particles, and any remaining fine particles, to this dispersion since it may be difficult to prepare, handle and disperse into oil a blend of all the required fine and coarse particles in dry powder form. However some of the fine particles, for instance up to a quarter, may be introduced with the coarse particles. Generally substantially all the particles below 3 microns are present in the initial dispersion.

The fine polymer particles in the initial dispersion preferably have a particle size in the range 0.1 to 2 or 3 microns. The initial dispersion of such particles must be sufficiently stable that it does not aggregate during manufacture or processing. It can conveniently be made by reverse phase emulsion or suspension polymerisation, most preferably by reverse phase suspension polymerisation. Thus aqueous droplets of monomer are dispersed in the non-aqueous liquid in the presence of a suspension stabiliser and either in the absence of emulsifier or in the presence of an amount of low HLB emulsifier that is insufficient for causing formation of micelles in which emulsion polymerisation might occur. Polymerisation is then initiated in conventional manner, generally using water soluble initiator, and occurs within the aqueous monomer droplets to form aqueous polymer droplets.

Suitable polymeric suspension stabilisers include amphipathic copolymers of hydrophobic monomers with hydrophilic monomers which are soluble or dispersible in liquids of low polarity. The preferred stabilisers are either completely soluble or form fine dispersions in the continuous phase but are substantially insoluble in the monomer solution and do not form micelles in the continuous phase. These are typified by copolymers of alkyl acrylates or methacrylates with acrylic or methacrylic acid and copolymers of alkyl acrylates or methacrylates with dialkyl amino alkyl-(generally dimethyl aminoethyl-) acrylate methacrylate or quaternary ammonium or acid salt derivatives of these amino monomers. The most suitable of these are copolymers of alkyl methacrylates, where the alkyl group is a linear hydrocarbon of 12–18 carbon atoms, with methacrylic acid or trimethyl-beta-methacryloxyethyl-ammonium chloride and terpolymers with methyl methacrylate and hydroxyethylacrylate. Suitable materials are described in British Patent Specification No. 1,482,515, U.S. Pat. No. 4,339,371 and EP No. 126528.

The amount of suspension polymerisation stabiliser used should be such as to provide at least a mono-layer absorbed at the interface between the polymer particle and the continuous phase and should stabilise the dispersion both during polymerisation and during subsequent azeotropic distillation. Generally it is from 0.05 to 10%, preferably 0.5 to 5%, based on the weight of aqueous polymer particles used. The choice of stabiliser is influenced by the particular homopolymer or copolymer being manufactured. The stabilisers for polymers containing acrylic acid or its sodium salt are preferably cationic and those for polymers containing dimethyl amino methyl acrylate or its salts or quaternary ammonium derivatives, or other cationic polymers, are preferably anionic.

If emulsifier is present, typical materials that may be used are sorbitan monooleate or monostearate or other low HLB emulsifier. The suspension is reduced to an appropriate small particle size (generally below 5 microns) by the application of shear alone or by the combination of shear and a small amount of emulsifier (for instance up to 2%) or by the choice of a water immiscible liquid that promotes the formation of small particles. If polymerisation is to be by reverse phase emulsion polymerisation then larger amounts, for instance up to 10%, may be used.

The non-aqueous liquid may be any water immiscible liquid known for reverse phase polymerisation processes, such as those discussed in U.S. Pat. No. 4,052,353 and EP Pat. No. 126528. Examples are aromatic and aliphatic hydrocarbons and halogenated hydrocarbons.

The resultant aqueous dispersion of aqueous polymer in oil will generally contain 20 to 60% by weight oil, 15 to 50% by weight water and 15 to 50% by weight polymer, preferably 25 to 45% polymer.

The dehydration of the dispersion is preferably conducted by azeotropic distillation preferably under reduced pressure. To facilitate this distillation, the non-aqueous liquid in which the aqueous monomer droplets are dispersed preferably is a blend of volatile and non-volatile organic liquids. The water content of the dried polymer particles is usually below 25% and is generally not substantially greater than the equilibrium moisture content of the particles if they were exposed to the atmosphere and may be reduced to a lower amount, for instance to less than 10% or 5% by weight of the polymer. The amount of polymer is usually 30 to 60% by weight of the dehydrated dispersion, preferably 40 to 55%, most preferably about 50%, but can be higher, e.g. about 68%, and the invention provides a valuable way of increasing solids contents without causing deoiling, instability or loss of pumpability.

The coarse particles that are added to the dehydrated dispersion of fine particles also will normally have a water content not substantially greater than the equilibrium moisture content of the particles when exposed to the atmosphere and may have a lower moisture content.

The coarse particles should be substantially free of particles above 300 microns since the presence of larger particles in significant amounts tends to destabilise the product. However small amounts of these larger particles can be included provided they do not result in excessive destabilisation of the product. Generally not more than 20%, and preferably not more than 5% and most preferably 0% by weight, of the particles based on the weight of coarse particles will have a size above 300 microns. Generally not more than 5%, and preferably 0%, by weight of the particles based on the weight of coarse particles will have a size above 700 microns.

The coarse particles may have been made by bead polymerisation, that is to say by reverse phase suspension polymerisation using amounts of stabiliser and, optionally, emulsifier such that the desired large particle size is obtained. Beads made in this method may be introduced into the dispersion as dry beads, free of liquid, or if a significant proportion of the beads are small, for instance if the beads are mainly in the range 10 to 100 microns, they may be introduced as a slurry in an organic liquid, for instance an alcohol. Often at least 95% by weight of the beads are below 200 microns and preferably at least 80% are below 150 microns. Usually at least 80%, and preferably at least 90%, by weight is between 10 and 200, preferably 20 and 150, microns. The use of coarse bead particles is particularly useful when mobile dispersions of particularly high solids content are desired.

Preferably however the coarse particles are made by grinding larger pieces of polymer and in particular they are preferably made by grinding in conventional manner polymer made by gel polymerisation. The ground particles preferably have a spread of particle sizes in the range 50 to 150 or 200 microns and most preferably up to 250 microns. Best results are obtained when at least 50% by weight of the particles have a size of above 100 microns and when at least 25% by weight of the particles have a size in the range 150 to 250 microns.

The desired particle size range may be achieved either by grinding a product to the desired size or by sieving a ground product to extract the particles of the desired size.

The use of ground particles is particularly useful when a fluid product having high solids content and containing particularly high molecular weight polymer is desired, since the polymer may have been made by gel polymerisation to a very high molecular weight.

The monomers from which the coarse particles have been formed are generally selected from the same monomers as those from which the fine particles have been formed and usually both types of polymer particles will be formed from similar or identical monomer or monomer blends.

The monomers may be any suitable water soluble ethylenically unsaturated monomer especially acrylamide and other acrylic monomers as well as any other conventional ethylenically unsaturated monomers, for instance vinyl or allyl monomers, e.g. diallyl dimethylammonium chloride. The monomers may be non-ionic, for instance acrylamide, anionic, for instance sodium acrylate, or cationic, for instance dialkylaminoalkyl acrylate or methacrylate or an acid addition or quaternised derivative thereof.

Broadly, the polymers can be any of those that are usefully provided by the manufacturer in the form of a dispersion in oil for flocculation or other purposes and include all those proposed in U.S. Pat. No. 4,052,353 and in the literature referred to therein. Particularly preferred polymers are dialkylaminoalkyl acrylate or methacrylate copolymers with acrylamide, generally as quaternary derivatives.

The polymers are usually water soluble, in which event they should be linear, but if water swellable polymers are required the polymer may be cross-linked with a small amount of conventional cross-linking agent.

It is generally necessary for there to be at least one part and preferably at least 3 or at least 3.5 parts coarse particles per part by weight fine particles. Although the amount of coarse particles may be up to 7 parts, it is usually not more than 6, and preferably not more than 5 parts. Preferred compositions comprise one part by weight fine particles, 0.5 to 1.5 parts by weight of the non-aqueous liquid and 1 to 7, most preferably 3 to 6 and especially 3.5 to 5 parts by weight of the coarse particles.

Additionally the composition may contain traces of emulsifier, for instance as was used to form the initial emulsion and small amounts of polymeric stabiliser, as discussed above, that was present to form the initial dispersion of fine particles and, if the coarse particles are beads, may be present as a film on the beads. The polymeric stabiliser and other additives should preferably be such as to cause no significant increase in the viscosity of the composition.

It is possible to add a dispersion stabiliser such as bentone or other clay or inorganic dispersion stabiliser as proposed in U.S. Pat. No. 4,374,216 and which does increase viscosity. Although this may slightly reduce the minimum amount of polymer that has to be present to achieve satisfactory stability, it tends to depress significantly the maximum amount of polymer that can be tolerated, because of the significant increase in viscosity that it causes. It is generally therefore preferred to omit such dispersion stabilisers. If a dispersion appears to need the addition of such a stabiliser to improve it, a similar effect can often be obtained, without unsatisfactory increase in viscosity and with increased polymer content, by increasing the proportion of fine particles.

Provided the total polymer content of the dispersion is above 70%, and preferably above 72 or 73%, it is possible in the invention to formulate substantially stable, and preferably wholly stable, pumpable liquid compositions by appropriate choice of polymer particles, having regard to their size distribution and shape (i.e. whether the coarse particles are ground gel particles or bead particles). If any particular composition is found to have a viscosity that is too high for pumping using the available equipment, it is generally necessary to reduce the total amount of polymer in the dispersion and/or to increase the average particle size. If a clay thickener is present and the viscosity is too high, the thickener should be omitted. If the coarse particles are ground gel particles and the viscosity is too high, lower viscosity may be obtainable by replacing the ground particles by coarse bead particles. In order that the composition is pumpable by convenient equipment, it must normally contain not more than 85%, and preferably contains not more than 82% by weight polymer and, when the coarse particles are ground it is generally best for the total weight of polymer to be not more than 80%.

If the composition settles too rapidly for its intended purpose (i.e. before use or on storage), this tendency can be reduced by reducing the average particle size or by adding a clay or other inorganic thickener or preferably, by increasing the proportion of fine particles or, very surprisingly, by increasing the total amount of polymer in the dispersion. Generally, from the point of view of the composition being resistant to unsatisfactory settling, the composition should contain at least 72% by weight of the polymer up to the maximum amount that is pumpable. For most purposes, the amount of polymer should be at least 75% and often at least 77%.

If deoiling is observed to an unsatisfactory extent, it can generally be reduced or eliminated by reducing the total polymer content or, if a clay type thickener is present, by omitting this. With some compositions, particularly those containing bead particles, deoiling may not be a limiting problem as it may not occur until the viscosity of the composition is so high that pumping has become difficult.

In general the polymer content of the dispersion can be increased as the maximum particle size of the coarse particles increases, up to about 250 or 300 microns but the range of concentrations of polymer over which pumpable dispersions of optimum stability can be formed tends to decrease as the particle size increases.

For a general indication of suitable values, reference should be made to the Table in the Example. Although the values there are derived for the particular polymers indicated in the Example and for the particular proportions of fine to coarse polymer particles, those values appear to be generally applicable to other polymer types and proportions, for instance to within ±2 or 3%. Values for particle sizes other than those shown in the Table may be obtained by interpolation.

When the polymer particles are to be used, for instance as flocculants, it is usually desired to dissolve or swell the polymer particles in water and in order to promote distribution of the polymer particles into water, upon mixing the dispersion with water, it may be desirable to include in the water or in the dispersion a suitable oil in water, high HLB, emulsifier. Water soluble surfactants of the type described in U.S. Pat. No. 4,052,353 may be suitable but it is generally preferred to use an oil soluble, water insoluble, surfactant. The amount of emulsifier will, based on polymer, be much less than the amounts that have been required with the present commercial liquid polymer systems and in some instances it is satisfactory to omit the emulsifier totally. If present, the amount is usually below 5%, preferably below 2% and often below 1% by weight of polymer.

The following are examples of the invention.

EXAMPLE 1

About 25 parts of the desired monomer or monomer blend, for instance acrylamide and quaternised dimethyl amino ethyl acrylate, may be dissolved in about 25 parts by weight water and the solution dispersed in about 40 parts of equal amounts of volatile and non-volatile oil in the presence of about 0.5 parts low HLB emulsifier together with one of the preferred suspension stabilisers identified above and described in British Pat. No. 1,482,515. Shear is applied until a particle size of about 1 to 2 microns is achieved, the system is deoxygenated and polymerisation initiator is added. After the exotherm is completed, pressure is reduced and water and volatile oil are removed by azeotropic distillation.

In a separate operation the same monomer blend is gel polymerised in conventional manner to produce a polymer gel which is then comminuted, dried and ground in conventional manner and screened to give a particle size range of zero to 250 microns, with the majority being in the range 150 to 250 microns. About 110 parts by weight of the particles (exposed to the atmosphere) are stirred into the dispersion resulting from the azeotropic distillation. The final product has an active polymer content of around 80% and is a stable dispersion.

If desired about 1.5 parts by weight of an oil in water emulsifying agent that is insoluble in water and that has HLB around 8 or 9 may be added to the dispersion. The dispersion may be stirred into water whereupon the polymer particles will dissolve upon standing, optionally with agitation.

EXAMPLE 2

A dispersion is formed of about 50 parts by weight oil and 50 parts by weight of a copolymer of 62 mole % acrylamide and 38 mole % dimethylaminoethyl acrylate quaternised with methyl chloride. The particle size of the polymer dispersion is below 3 microns and the water content is below 10%. This dispersion is made by reverse phase suspension polymerisation in conventional manner followed by dehydration by azeotropic distillation. Various amounts of coarse polymer particles were blended into this dispersion to produce total polymer contents ranging from about 70 to about 82%. For instance a 70% polymer content was obtained by blending 40 parts coarse polymer with 60 parts dispersion whilst 80% polymer content was obtained by blending 60 parts polymer with 40 parts of the dispersion.

Three polymer types were used as the coarse polymer. Type A was a polymer made by gel polymerisation of 80 mole % acrylamide and 20 mole % dimethylaminoethyl acrylate quaternised with methyl chloride, followed by comminution to give ground particles having a maximum size of 125 microns, 180 microns or 250 microns. Polymer B was a copolymer formed from the same monomers as polymer A but made by reverse phase bead polymerisation to give beads having about 99% by weight below 300 microns, about 90% below 100 microns, about 45% below 50 microns and about 5% below 10 microns. Polymer C was a bead polymer, made by reverse phase copolymerisation of 62 mole % acrylamide and 38 mole % dimethylaminoethyl acrylate quaternised with methyl chloride having about 99% by weight below 300 microns, about 80% below 100 microns, about 40% below 50 microns and about 8% below 10 microns.

Blends of various amounts of bead polymers B and C and of various amounts of gel polymer A having particle sizes up to 125, 180 or 250 microns, with or without 1% (by weight of the total dispersion) added bentone were formed. The viscosity, deoiling and settling characteristics of each of the resultant dispersion was measured.

In Table 1 below the values in the column "Viscosity" are the maximum amount of polymer that could conveniently be incorporated in the dispersion before the viscosity of the dispersion exceeded about 30,000 cPS. The values in the column "Deoiling" are the maximum amount of polymer that could be included in the dispersion before significant deoiling was observed to occur. With the bead polymers, the viscosity limit had been exceeded before deoiling occurred. The values in the column "Settling" are the minimum amount of polymer that had to be present to avoid significant settling, and a tendency to cake formation on prolonged standing. The values are % by weight of the dispersion.

The values stated in the column "Preferred" are the values that will give reasonably satisfactory properties and the values in the column "Optimum" are the values that give best properties. Naturally within these optimum ranges, it is desirable for the concentration to be as high as possible.

TABLE 1

| Coarse Polymer | Bentone | Viscosity | Deoiling | Settling | Preferred | Optimum |
|---|---|---|---|---|---|---|
| A-125 | 0 | 79 | 79 | 73 | 72–80 | 73–79 |
| A-180 | 0 | 79.5 | 79 | 76 | 74–80.5 | 76–79.5 |
| A-250 | 0 | 80 | 79 | 77 | 75–81 | 77–80 |
| A-125 | 1% | 76.5 | 75.5 | 72 | 71–77 | 72–76.5 |
| A-180 | 1% | 77 | 76.5 | 72 | 71–78 | 72–77 |
| A-250 | 1% | 78 | 77 | 74 | 73–79 | 74–78 |
| B-Bead | 0 | 81 | — | 78 | 77–82 | 78–81 |
| C-Bead | 0 | 82 | — | 78 | 77–83 | 78–82 |

I claim:

1. A liquid, substantially stable, pumpable composition comprising a dispersion of substantially anhydrous particles of water soluble or water swellable polymer in a non-aqueous liquid wherein the amount of particles is at least 70% by weight of the dispersion and the particles consist of 1 part by weight fine particles having a particle size below 3 microns and about 0.1 to 7 parts by weight coarse particles having a particle size of 10 to 300 microns with substantially no particles above 300 microns.

2. A composition according to claim 1 containing one part by weight fine particles having a particle size below 3 microns and 1 to 7 parts by weight coarse particles having a particle size of 20 to 250 microns.

3. A composition according to claim 1 having a polymer content of from 72 to 85% by weight of the dispersion.

4. A composition according to claim 1 wherein the coarse particles are ground polymer particles and the polymer content of the dispersion is from 75 to 80% by weight.

5. A composition according to claim 1 wherein the coarse particles are bead polymer particles and the composition has a polymer content of 77 to 82% by weight.

6. A composition according to claim 1 that has been made by blending the coarse particles into a dispersion in oil of most or all of the fine particles, the dispersion of fine particles having been made by reverse phase polymerisation followed by azeotroping.

7. A composition according to claim 1 that has been made by blending the coarse particles into a dispersion in oil of most or all of the fine particles, the dispersion of fine particles having been made by reverse phase polymerisation followed by azeotroping and in which the dispersion of fine particles has a polymer content of 30 to 68% by weight.

8. A composition according to claim 1 that has been made by blending the coarse particles into a dispersion in oil of most or all of the fine particles, the dispersion of fine particles having been made by reverse phase polymerisation followed by azeotroping and in which the dispersion of fine particles has a polymer content of 40 to 60% by weight.

9. A composition according to claim 1 substantially free of inorganic dispersion stabiliser and any components that would contribute to the viscosity.

10. A composition according to claim 1 including an inorganic dispersion stabiliser.

11. A liquid, substantially stable, pumpable composition comprising a dispersion of substantially anhydrous particles of water soluble or water swellable polymer in a non-aqueous liquid wherein the amount of particles is at least 70% by weight of the dispersion and the particles consist of 1 part by weight fine particles having a particle size below 10 microns and 1 to 7 parts by weight coarse particles having a particle size of 20 to 250 microns with substantially no particles above 300 microns.

12. A composition according to claim 11 having a polymer content of from 72 to 85% by weight of the dispersion.

13. A composition according to claim 11 wherein the coarse particles are ground polymer particles and the polymer content of the dispersion is from 75 to 80% by weight.

14. A composition according to claim 11 wherein the coarse particles are bead polymer particles and the composition has a polymer content of from 77 to 82% by weight.

15. A liquid, substantially stable, pumpable composition comprising a dispersion of substantially anhydrous particles of water soluble or water swellable polymer in a non-aqueous liquid wherein the amount of particles is at least 70% by weight of the dispersion and the particles consist of 1 part by weight fine particles having a particle size below 10 microns and about 0.1 to 7 parts by weight coarse particles having a particle size of 10 to 300 microns, wherein at least half of the coarse particles have a particle size of above 20 microns with substantially no particles above 300 microns.

16. A composition according to claim 15 having a polymer content of from 72 to 85% by weight of the dispersion.

17. A composition according to claim 15 wherein the coarse particles are ground polymer particles and the polymer content of the dispersion is from 75 to 80% by weight.

18. A composition according to claim 15 wherein the coarse particles are bead polymer particles and the composition has a polymer content of from 77 to 82% by weight.

* * * * *